April 10, 1945.   B. L. SPAFFORD   2,373,426
POTATO HARVESTER
Filed July 20, 1943   3 Sheets-Sheet 1
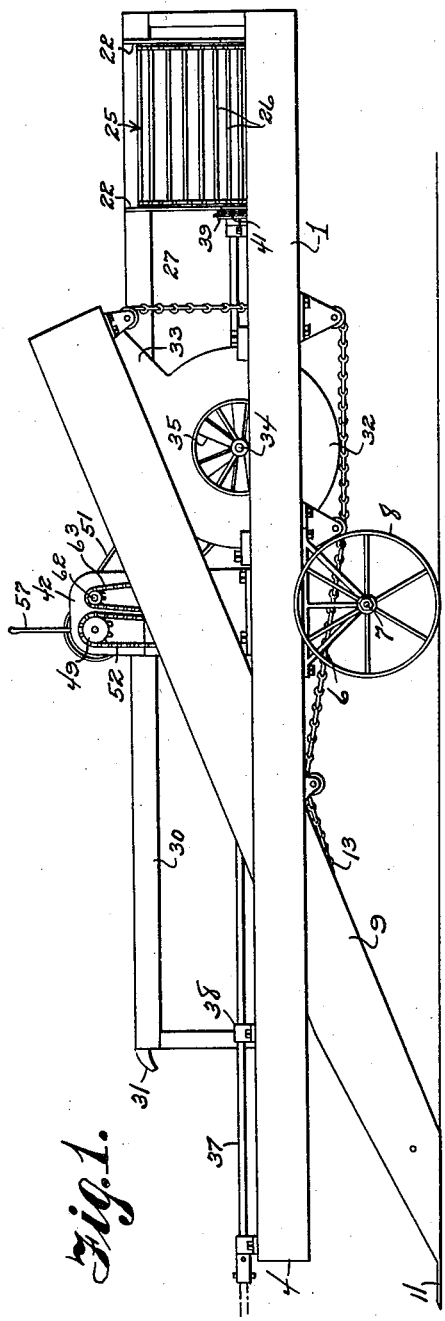
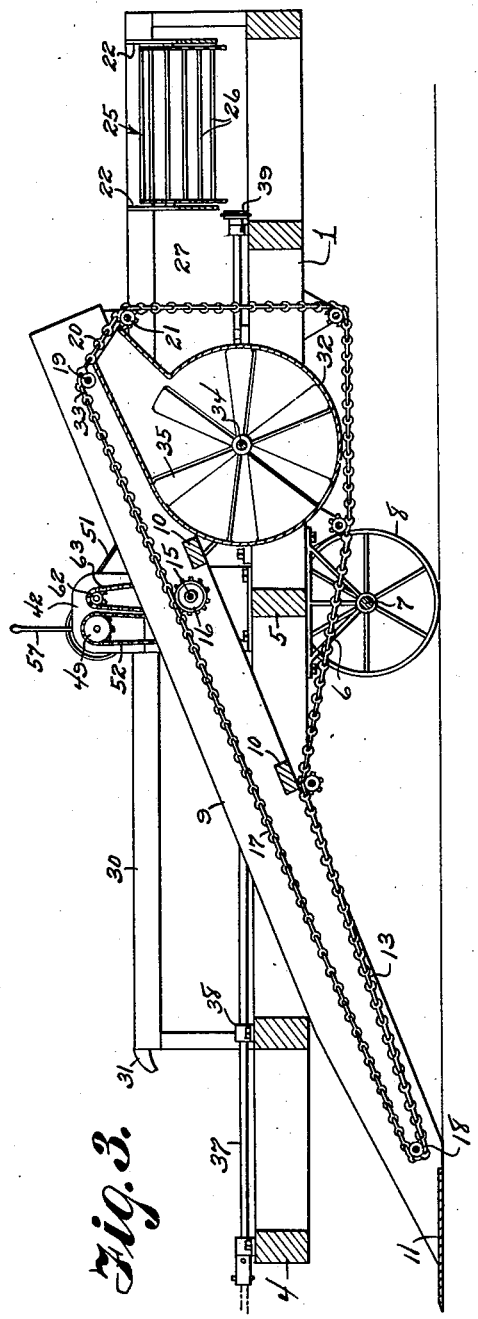
Bert L. Spafford   INVENTOR.
BY
Victor J. Evans & Co.
ATTORNEYS

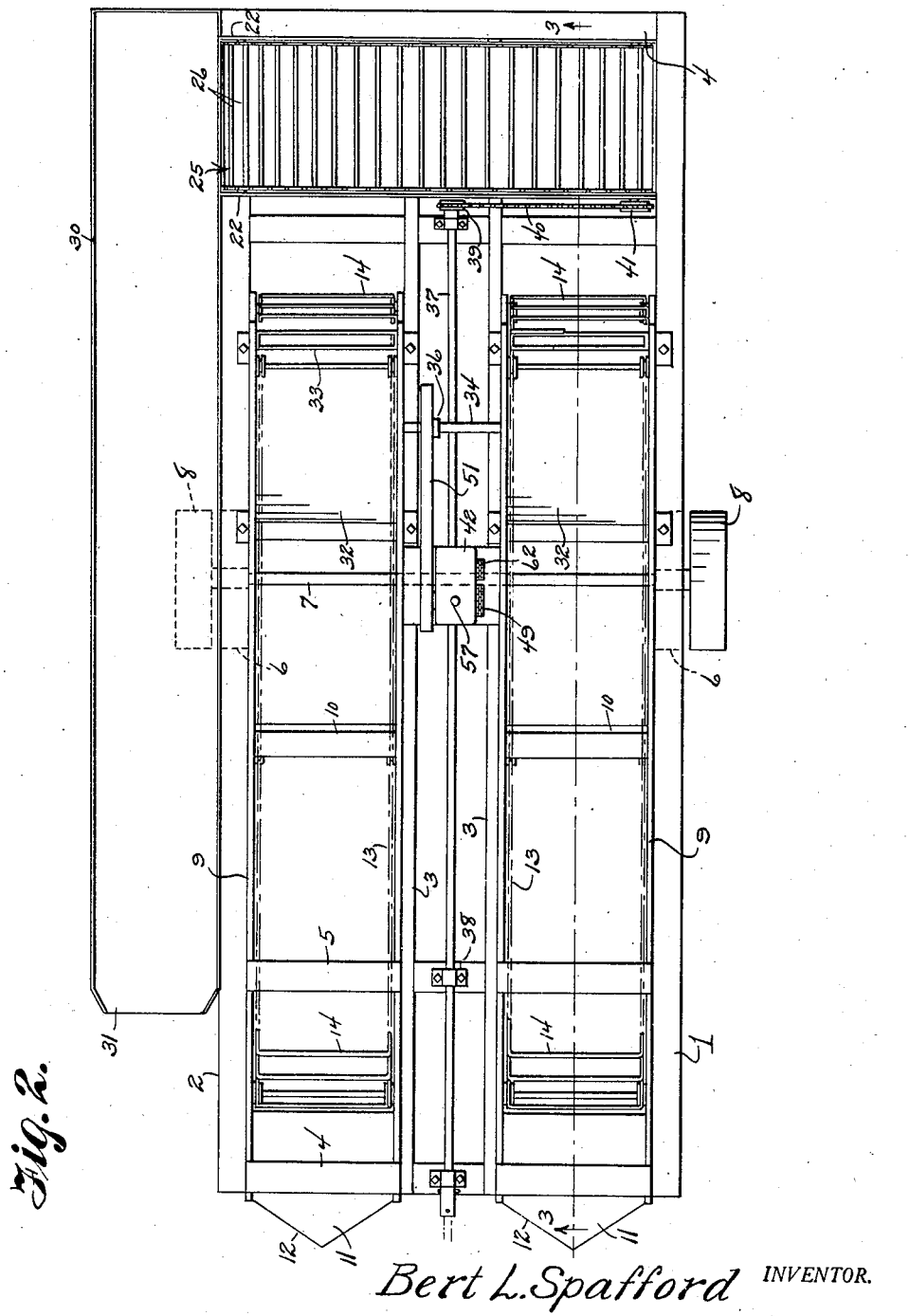

April 10, 1945.   B. L. SPAFFORD   2,373,426
POTATO HARVESTER
Filed July 20, 1943   3 Sheets-Sheet 3

Bert L. Spafford INVENTOR.

BY
Victor J. Evans & Co.
ATTORNEYS

Patented Apr. 10, 1945

2,373,426

UNITED STATES PATENT OFFICE 2,373,426

POTATO HARVESTER

Bert L. Spafford, Starks, Wis.

Application July 20, 1943, Serial No. 495,513

5 Claims. (Cl. 55—51)

This invention relates to potato harvesters, and its general object is to provide a machine for digging potatoes from a field and conveying the same to a picking and sacking table, as the machine as drawn through the field.

An important object is to provide a potato harvester that includes means for removing debris and particularly stones and like solid matter from the potatoes before they reach the so-called picking and sacking table, the potatoes and foreign matter being conveyed from plowing means and from the first conveying means they are forced by a blast of air across a relatively wide space to a second conveying means that carries the potatoes substantially free from foreign matter to said table, as dirt, vines and like debris are removed therefrom by the blast of air which is of sufficient pressure to carry the potatoes across said space, but not stones and like solid matter which are dropped through said space to the ground.

A further object is to provide a potato harvester that tends to prevent the potatoes from becoming bruised, due to the fact that stones and the like are removed therefrom before the potatoes are dropped from one conveying means to another.

Another object is to provide a potato harvester that is drawn and operated by a tractor, the harvester or machine including a shaft suitably connected to and driven by the tractor, and the shaft has suitable means connected thereto for operating the conveying means and the blower.

A still further object is to provide a potato harvester that is capable of simultaneously handling two rows of potatoes.

Another object is to provide a potato harvester that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side elevation of the machine which forms the subject matter of the present invention.

Figure 2 is a top plan view thereof.

Figure 3 is a sectional view taken approximately on line 3—3 of Figure 2, looking in the direction of the arrows.

Figure 4:
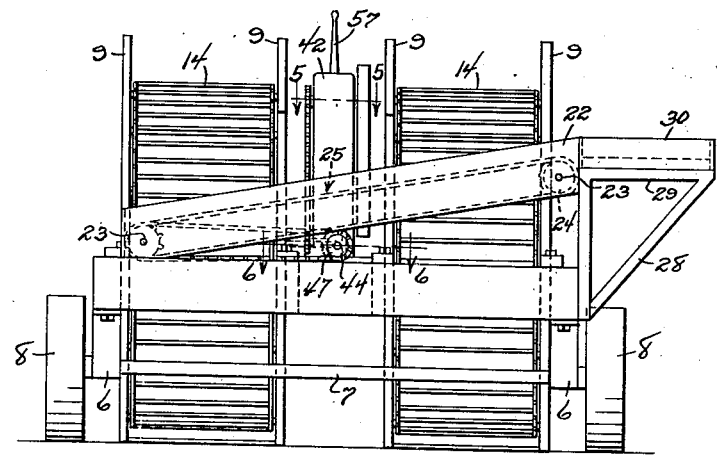
Figure 4 is a rear view of the machine.

Referring to the drawings in detail, it will be noted that the machine shown includes an elongated rectangular main frame that is made up of longitudinal outer or side members 1 and 2 respectively, a pair of spaced longitudinal parallel intermediate members 3 paralleling the side members, outer end members 4 and intermediate cross members 5 which together with the end members 4 are secured to and bridge the longitudinal members, as best shown in Figure 2. Secured to and depending from the side members 1 substantially midway the ends thereof are brackets 6 that have mounted therein an axle 7, and journaled on the axle are ground engaging wheels 8.

The machine shown is of the duplex type, that is it simultaneously handles two rows of potatoes and for that purpose it includes a pair of carrier frames suitably secured to the main frame and disposed at an inclination between the side members 1 and the intermediate members 3. Each carrier frame which is identical, includes parallel walls 9 having spacing strips 10 secured to and bridging the same at the lower longitudinal edges thereof, as best shown in Figure 3. The forward or lower portions of the walls 9 are gradually reduced toward their inner ends, the latter being flat and have secured thereto a plate like plow element 11 that is provided with an angular ground penetrating front end 12, as clearly shown in Figure 2.

Trained about sprockets and rollers is an endless conveyor 13 of the chain type, that includes spaced cross rods 14 for carrying the potatoes from the plow element 11 to the top of the carrier frame. The sprockets and rollers are fixed to shafts mounted in suitable bearing brackets secured to the main and carrier frames, as best shown in Figure 3, and one of these shafts which is indicated by the reference numeral 15 extends through both the carrier frames and the sprockets 16 thereon act to drive the conveyors 13, while the remaining sprockets and rollers act as idlers for the conveyors 13. The run 17 of each of the conveyors 13 is disposed between the walls 9 and the drive sprockets 16 engage that run which extends between the lower idle sprocket 18 and the rollers 19, the latter being disposed adjacent to the upper ends of the walls 9, and a short run 20 is disposed at a rearward and downward inclination from the rollers 19 to sprockets 21 that are mounted just below the upper ends of the walls, as best shown in Figures 1 and 3.

An elevator frame is suitably supported at an inclination across the rear end of the machine above the main frame and rotatably mounted in and bridging the parallel walls 22 of the elevator frame adjacent the ends thereof are shafts 23 having sprockets 24 secured thereto, the sprockets 24 having trained thereon an endless chain type conveyor 25 that includes cross rods 26. The elevator frame is disposed at right angles to and a considerable distance rearwardly of and below the upper ends of the carrier frames, to provide a space between the same. For distinction that space is indicated by the reference numeral 27 and is clearly shown in Figures 1 and 3.

Secured to and rising from the side member 3 of the main frame are supporting brackets 28 having horizontal upper portions 29 which have a flat trough like picking and sacking table 30 secured thereto, the table being of a length to extend from the rear end of the machine, and the front end of the table terminates short of the front end of the machine, into an outlet spout or sacker 31. The upper end of the elevator frame is secured to the table for directing the clean potatoes thereto, as will be apparent upon inspection of Figure 4.

A blower is provided for each unit and is disposed between the walls 9 of the carrier frames. Each blower includes a drum like housing 32 supported on the main frame for disposal of the outlet spout 33 thereof at an upward and rearward inclination, to terminate at its outer end in close proximity to the underside of the run 20 of the conveyor 13 for forcing the potatoes as they fall down the run 20 across the space 27 between the conveyor 13 and the elevator conveyor for the latter to receive the potatoes but stones and like solid matter will fall through said space to the ground, with the result it will be seen that the potatoes will be fed to the elevator conveyor free from stones and such materially eliminates bruising the potatoes, as will be apparent. The blowers also remove dirt, vines and like debris from the potatoes, therefore the latter are received by the picking and sacking table in a clean condition. A single drive shaft 34 is provided for both of the blowers and has blades 35 secured thereto, the shaft 34 extending between the housings, as shown in Figure 2 and has a pulley 36 fixed thereto. The outer faces of the housings have inlet openings therein, as shown in Figure 1.

The draft means for my machine is preferably a tractor or like engine propel means, and in order to operate the conveyors and the blowers, I provide a relatively long drive shaft 37 mounted for rotation in bearings 38, secured to the end and cross members 4 and 5, for disposal of the shaft 37 along the longitudinal center of the main frame, as best shown in Figure 2. The shaft 37 has its forward end suitably connected to the tractor to be driven thereby, and fixed to the rear end of the shaft 37 is a sprocket 39 having a chain 40 trained about the same and a chain is also trained about a sprocket 41 that is fixed to the lowermost shaft 23 of the conveyor 25, so that the latter is directly operated from the drive shaft, as will be apparent upon inspection of Figure 2.

The conveyors 13 as well as the blowers are operated from the drive shaft 37, through the medium of a transmission which includes a casing 42 fixed to and rising from a base plate 43 that is secured to and bridges the intermediate members 3 substantially midway the ends of the main frame. The shaft 37 extends through the lower end of the casing 42 and that portion of the shaft within the casing has fixed thereto a bevel gear 44 which meshes with a bevel gear 45, the latter being fixed to a stub shaft 46 that is mounted in a bearing formed on one side wall of the casing. The stub shaft 46 extends through the casing and has fixed to the outer end thereof a sprocket 47.

Figure 5:
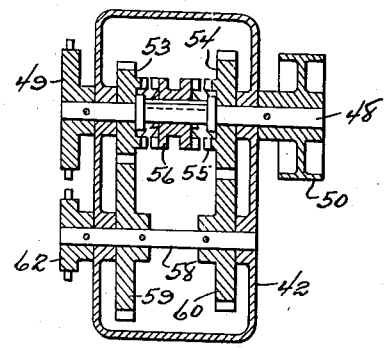
Figure 5 is a sectional view taken through the transmission and approximately on line 5—5 of Figure 4, looking in the direction of the arrows.
Figure 6:
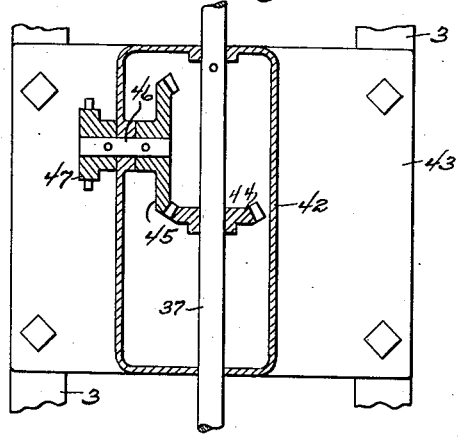
Figure 6 is a sectional view taken approximately on line 6—6 of Figure 4, looking in the direction of the arrows.

Extending transversely through the casing 42 adjacent the upper end thereof is a transmission shaft 48, having a relatively large sprocket 49 fixed to one outer end portion thereof, and fixed to the outer end portion of the shaft 48 is a pulley 50 for a belt 51 that is trained about the pulley 36 to operate the blowers. A chain 52 is trained about the sprockets 47 and 49 and rotatably mounted on the shaft 48 for disposal within the casing are gears 53 and 54 respectively. Each of these gears has clutch teeth 55 formed on the confronting faces thereof, and keyed to and slidably mounted on the shaft 48 is a clutch element 56 that is shifted through the instrumentality of a handle 57, for disposing the teeth on one side of the clutch element in mesh with the teeth of the gear 53 or with the teeth of the gear 54. A shaft 58 is mounted for rotation in the casing 42 for disposal in parallelism with the shaft 48 and the shaft 58 has gears 59 and 60 fixed thereto; the gear 59 meshing with the gear 53 and the gear 60 meshing with the gear 54. It will be noted as best shown in Figure 5 that the ratio of the gears 53 and 59 is approximately 3 to 5 and the ratio of the gears 54 and 60 is approximately 7 to 8. A sprocket 62 is fixed to the outer end of the shaft 58 and the sprocket 62 receives a chain 63 that is trained about a sprocket that is fixed to the shaft 15 for operating the conveyors 13. By that construction, it will be obvious that the speed of the conveyors 13 can be changed.

From the above description and disclosure in the drawings, it is believed that the operation of my machine will be obvious, but it might be mentioned that it is connected to the tractor by suitable hitch means to be drawn thereby through a field, with the wheels 8 straddling two rows of potatoes which are dug or plowed from the ground by the plow elements 11. The potatoes, together with stones and like debris are conveyed from the plow elements by the conveyors 13, and as the conveyors include cross rods 14 that are spaced a considerable distance apart, it will be obvious that the major portion of the dirt will fall through the conveyors, but the potatoes and stones will be carried to the upper ends thereof. When the potatoes and stones are traveling down the inclined runs 20, the air from the blowers will force the potatoes across the space 27 to the elevator conveyors, and any vines and debris that may reach the inclined runs 20 will be blown away, while the stones will drop through the space 27 to the ground. The potatoes are conveyed to the table, where they are sorted and sacked.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a potato harvester, plowing means, an upwardly inclined conveyor for receiving potatoes from the plowing means, a second conveyor below and spaced to the rear of the upper end of the first conveyor for receiving potatoes from the first conveyor, means for directing a blast of air against the potatoes at said delivery end of the first conveyor and above and spaced from the second conveyor for carrying the potatoes across the space between the conveyors to the second conveyor, and said space being adapted for the passage of stones therethrough from the delivery end of the first conveyor to the ground.

2. In a two row potato harvester, plowing means, a conveyor extending upwardly from the plowing means for receiving potatoes therefrom, a second conveyor arranged adjacent to, below and to the rear of the upper end of the first conveyor and spaced a considerable distance therefrom, means below the first conveyor directing a blast of air through the delivery end portion of the first conveyor in a direction above and to one side of the second conveyor for carrying the potatoes across the space between the conveyors to the second conveyor, and said space being adapted for the passage of stones therethrough from the first conveyor to the ground.

3. In a potato harvester, plowing means, a conveyor extending upwardly from the plowing means for receiving potatoes therefrom, a picking and sacking table, a second conveyor leading to said table and disposed at right angles to and below the upper end of the first conveyor in spaced relation therefrom, said first conveyor having a downwardly inclined run extending from its upper end and disposed in the general direction of the second conveyor, means directing a blast of air through said run for forcing the potatoes therefrom and across the space between the conveyors to the second conveyor, and said space being adapted for the passage of stones therethrough from said run to the ground.

4. In a potato harvester, having a main frame, and an upwardly inclined carrier frame, plowing means at the lower end of the carrier frame, side walls included in the carrier frame, a conveyor including a run disposed between the said walls and for receiving potatoes from the plowing means, a picking and sacking table secured to and extending laterally along the length of the main frame, a second conveyor disposed at an upward inclination toward said table for carrying potatoes thereto and spaced a considerable distance rearwardly of and below the first conveyor, said first conveyor having a run extending at a downward inclination a short distance from the upper end of the first run and directed generally toward the second conveyor but not bridging the distance between said conveyors, a blower beneath the first conveyor having an outlet spout opening adjacent to the downwardly inclined run for delivering a blast of air therethrough and above the second conveyor to force potatoes across the space between the conveyors to the second conveyor, and said space being adapted for the passage of stones therethrough from the downwardly inclined run to the ground.

5. In a potato harvester, plowing means, an inclined conveyor for receiving potatoes from the plowing means, a second conveyor for receiving potatoes from the first conveyor and located below and spaced from the upper or delivery end thereof, a blower having a nozzle disposed for delivering a blast of air against the potatoes at said delivery end for carrying the potatoes across the space between the conveyors to the second conveyor, said space being adapted for the passage of stones therethrough from the first conveyor to the ground, a drive shaft, means for operating the second conveyor directly from the drive shaft, a transmission including a pair of shafts, means for driving one of the transmission shafts from the drive shaft and the latter transmission shaft being geared to the other transmission shaft to change the speed thereof, means operating the first conveyor from the last mentioned shaft, and means for operating the blower from the first mentioned transmission shaft.

BERT L. SPAFFORD.